(12) United States Patent
Werner et al.

(10) Patent No.: US 11,083,127 B2
(45) Date of Patent: Aug. 10, 2021

(54) SEEDING MACHINE TO PROVIDE TRANSVERSE TRAMLINES

(71) Applicant: Deere & Company, Moline, IL (US)

(72) Inventors: Roland Werner, Edingen-Neckarhausen (DE); Martin Kremmer, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 218 days.

(21) Appl. No.: 16/298,689

(22) Filed: Mar. 11, 2019

(65) Prior Publication Data

US 2019/0343037 A1 Nov. 14, 2019

Related U.S. Application Data

(60) Provisional application No. 62/669,018, filed on May 9, 2018.

(51) Int. Cl.
*A01C 7/10* (2006.01)
*A01C 7/16* (2006.01)

(52) U.S. Cl.
CPC .............. *A01C 7/102* (2013.01); *A01C 7/107* (2013.01); *A01C 7/16* (2013.01)

(58) Field of Classification Search
CPC ........... A01C 7/102; A01C 7/107; A01C 7/16; A01C 7/10; A01C 7/08; A01C 7/00
See application file for complete search history.

(56) References Cited

U.S. PATENT DOCUMENTS 6,199,000 B1 3/2001 Keller et al.
8,600,629 B2 12/2013 Zielke
(Continued)

FOREIGN PATENT DOCUMENTS

DE 102005010686 A1 10/2005
DE 102016207510 A1 11/2017
(Continued)

OTHER PUBLICATIONS

Jiang, W., et al. "Effects of Narrow Plant Spacing on Root Distribution and Physiological Nitrogen Use Efficiency in Summer Maize." The Crop Journal, 2013, No. 1, pp. 77-83.
(Continued)

*Primary Examiner* — Christopher J. Novosad

(57) ABSTRACT

A planting unit for a seeding machine comprising a seed supply, a seed meter and a seed delivery system to deposit the seed within a furrow. The seed meter is driven by an electronic control unit to achieve a pre-defined pattern of the seeds. The planting unit is adapted to skip dispensing of seeds at locations at which a tramline extends transversely to the travel direction. The following possibilities to achieve the tramline are described: (a) the seed meter comprises adjacent apertures for receiving the seeds and at least one of the apertures is closed, (b) a seed branch-off assembly is adapted to take a seed out of the seed delivery system, (c) the seed delivery system is slowed down to reduce the speed of the seed transport, (d) a seed transport device for moving a seed from the seed meter to the seed delivery system is disabled, or (e) a seed removal device is provided to provide the skip.

4 Claims, 4 Drawing Sheets

(56) References Cited

U.S. PATENT DOCUMENTS

| | | |
|---|---|---|
| 8,683,931 B1 * | 4/2014 | Lafferty .............. A01C 7/102 |
| | | 111/200 |
| 9,848,528 B2 | 12/2017 | Werner et al. |
| 2013/0174766 A1 | 7/2013 | Zielke et al. |
| 2014/0076216 A1 | 3/2014 | Kormann et al. |
| 2015/0025752 A1 | 1/2015 | Tolstedt et al. |
| 2017/0071124 A1 | 3/2017 | Werner et al. |

FOREIGN PATENT DOCUMENTS

| | | |
|---|---|---|
| EP | 0702888 A2 | 3/1996 |
| EP | 0868842 A1 | 10/1998 |
| EP | 1415523 A1 | 5/2004 |
| EP | 2227932 A1 | 9/2010 |
| WO | 2012015957 A1 | 2/2012 |
| WO | 2012134523 A1 | 10/2012 |
| WO | 2012135008 A2 | 10/2012 |
| WO | 2016164914 A1 | 10/2016 |
| WO | 2019084643 A1 | 5/2019 |

OTHER PUBLICATIONS

Karakowa, N. "Machines for Maize Cultivation." Agrartechnik, issue 3, Mar. 1959, pp. 108-109. (Machine translation attached),.
Nichols, M. A. "A Plant Spacing Study with Sweet Corn." New Zealand Journal of Experimental Agriculture, 1974, vol. 2, No. 4, pp. 377-379.
Pawlow, P. "The Mechanization of Rectangular Grid Sowing of Maize." Agrartechnik, 9th Ed., Mar. 1959, pp. 101-104. (Machine translation attached).
European Search Report issued in counterpart European Patent Application No. 19173373,2 dated Oct. 7, 2019 (9 pages).

* cited by examiner

SEEDING MACHINE TO PROVIDE TRANSVERSE TRAMLINES

TECHNICAL FIELD

The present disclosure relates generally to an agricultural machine. More particularly it relates to a seeding machine adapted to provide tramlines transversely to the work direction of the seeding machine.

BACKGROUND

Seeding machines are used in agriculture to deposit single seeds in the ground in order to grow plants in a field. Based on local position or speed sensors of the seeding machine or satellite-based positioning systems like GPS, the seeds may be deposited in desired positions in the forward direction of the seeding machine in order to achieve optimal growth conditions for the plants. Adjacent seeding units of a seeding machine may be synchronized to deposit the seeds in the soil in the transverse direction on a common line or in a desired pattern.

If tramlines can formed to extend in the transverse direction to the travel direction of the seeding machine to leave lanes without seeds, then hoeing and fertilizing can be performed on the field in two transverse direction, even if the distance between adjacent plants is smaller than the width of a tractor tire, avoiding or at least reducing the amount of spray chemicals for weed reduction.

In single grain seeding machines, the mechanical drive of seeding units is switched off if required to provide tramlines extending in the travel direction of the seeding machine or to avoid overlap on already-sown areas. This switch-off requires relatively complicated mechanisms, and may not work sufficiently reliably and with the required speed if it were attempted to be switched off and on relatively fast just to skip a single seed to provide the transverse tramline.

In a drill style machine, the machine may feed the grain between the seed dispenser and the respective seed tube leading the seeds into the furrow by means of vacuum back to the grain tank in order to switch the seeding operation off in the headland.

Other embodiments may remove a pressure differential on a seeding disk to switch seeding off at headlands, or have a seeding disk consisting of two parts that can be rotated with respect to each other to provide different hole patterns and thus seed distances.

A seeding machine that can be controlled to provide tramlines in a direction different from the planting direction, for example in a direction enclosing an angle of 90° or another suitable angle, in a simple and reliable manner, and also one which is suitable to relatively high travel speeds of the seeding machine, would enable transverse tramlines.

SUMMARY

A planting unit for a seeding machine comprising a seed supply, a seed meter and a seed delivery system to deposit the seed within a furrow. The seed meter is driven by an electronic control unit to achieve a pre-defined pattern of the seeds. The planting unit is adapted to skip dispensing of seeds at locations at which a tramline extending transversely to the travel direction is to be provided. The following possibilities to achieve the tramline are described: (a) the seed meter comprises adjacent apertures for receiving the seeds and at least one of the apertures is closed, (b) a seed branch-off assembly is adapted to take a seed out of the seed delivery system, (c) the seed delivery system is slowed down to reduce the speed of the seed transport, (d) a seed transport device for moving a seed from the seed meter to the seed delivery system is disabled, or (e) a seed removal device is provided to provide the skip.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 9 of the drawings.

Figure 1:
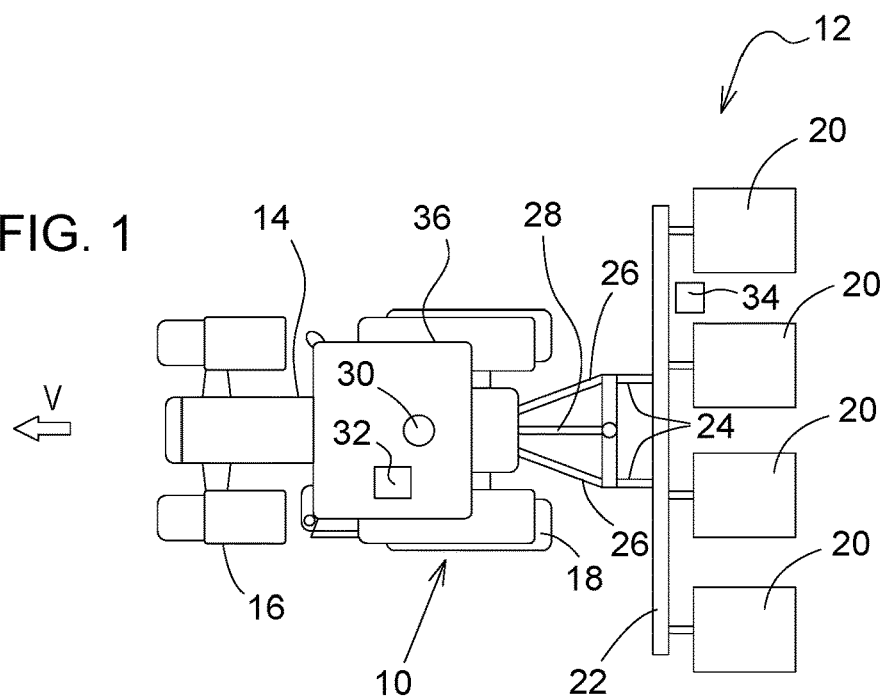
FIG. 1 is a schematic top view of a tractor with a seeding machine.

In FIG. 1, a tractor 10 with a seeding machine 12 is shown. The tractor 10 comprises a chassis 14 supported on steerable front wheels 16 and driven rear wheels 18. The seeding machine 12 comprises a number (in the embodiment shown: four) planting units 20 supported on a transverse toolbar 22. The toolbar 22 is supported on a support arrangement 24 connected to a three-point hitch of the tractor 10 with two lower rods 26 and one upper rod 28. In another embodiment, the seeding machine 12 could be supported on its own wheels and connected by a drawbar to a hitch of the tractor 10 or be a self-propelled unit.

Control of the planting units 20 is performed by an electronic control unit 34 which is connected to a positioning system receiver 30 provided on the roof of the tractor cab 36 and a user interface 32 within the cab. The user interface 32 can be a virtual terminal according to ISO 11783. Operation and control of the planting units 20 by the electronic control unit is described in detail in US 2017/0071124 A1, the contents of which incorporated herein by reference.

Figure 2:
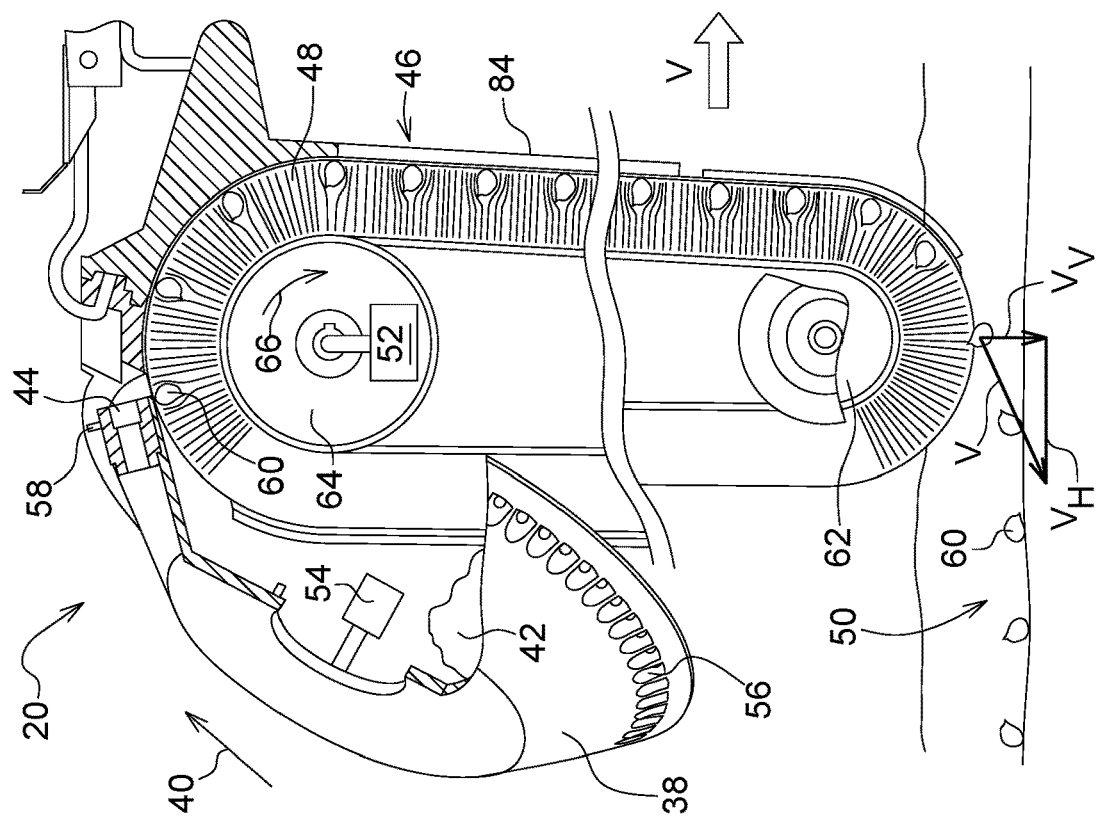
FIG. 2 is a schematic side sectional view of a seed meter and a seed delivery system of a planting unit of the seeding machine of FIG. 1.

Details of a planting unit 20 that can be used in the seeding machine 12 are shown in FIG. 2. The planting unit comprises a seed meter 38 and a seed delivery system 46. The seed meter 38 is a disk- or bell-shaped element with apertures 56 distributed in the vicinity of its circumference. The seed meter 38 is driven by an electric motor 54 to rotate around its symmetry axis (arrow 40), which is angled at about 45° to the horizontal, and collects seeds from a seed supply 42 in its apertures 56 when they run through the seed supply 42 during the lower part of their rotation. At the top of the rotation of the seed meter 38, a seed transport device 44 in the form of a wheel with fingers 58 distributed around its circumference, freely rotating its symmetry axis, removes the singularized seeds 60 from the apertures 56 such that they are transferred to the seed delivery system 46. The seed delivery system 46 comprises a brush belt 48 for transporting the seeds 60 into a furrow 50, which is opened by suited furrow openers of the planting unit 20 and closed after the seed 60 has been deposited. The brush belt 48 is entrained around two wheels 62, 64, the upper one of which being driven by an electric motor 52 to rotate in the direction indicated by arrow 66. The planting unit 20 of FIG. 2 is described in more detail in WO 2012/134523 A1, the entire contents of which are incorporated herein by reference.

Figure 3:
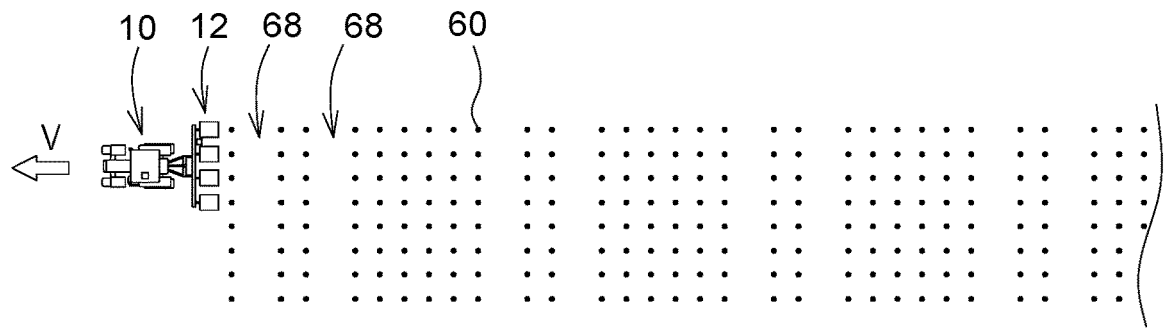
FIG. 3 is a top view of the seeding machine of FIG. 1 when planting a pattern with transverse tramlines.

The position of the seeds 60 in the furrow is controlled by the speeds of motors 54 and 52 which are controlled by the electronic control unit 34. Normally, the speed of motor 52 is controlled such that the speed of the brush belt 48 corresponds to the forward speed V of the tractor 10, such that the seeds 60 rather fall down from the brush belt 48 at its lower return point, i.e. the horizontal speed component vH indicated in FIG. 2 is relatively low, but it would also be possible to expel the seeds with a larger horizontal speed, if useful. The spacing and positioning of the seeds 60 along the furrow 50 is thus normally defined only by the rotational position and speed of the drive shaft of motor 54. The control unit 34 can be operated such that all planting units 20 work in a synchronized manner, such that adjacent seeds 60 in the lateral direction are deposited on a line as indicated in FIG. 3 or in another desired pattern. Herein, fine-tuning of the control of motors 52 and 54 can be performed based on sensors (not shown, but for example US 2014/0076216 A1) detecting the position of the seeds 60 in the furrow 50. Also the seed positions achieved on adjacent passes can be synchronized, as indicated in FIG. 3. The achieved rectangular pattern of seeds 60 and thus plants on the field has the advantage that hoeing and fertilizing can be performed in the forward direction V tractor 10 has during seeding and also in the direction extending transversely thereto. It should be noted that any other pattern of the seeds would be possible, like a diamond-shaped pattern (as shown in FIG. 3 of DE 10 2005 010 686 A1), by appropriate control of the motors 54 and 52 of the respective seeding units.

However, it is useful to provide a number of tramlines 68 in the transverse direction, i.e. skip deposition of seeds 60 at certain positions to leave parts of the field free from plants allowing a tractor or other vehicle to drive transversely to the direction v. The transverse direction can enclose an angle of 90° with the planting direction v or another suitable angle, as mentioned above. Other tramlines (not shown in FIG. 3) can also be provided in the forward direction v of the tractor 10 during seeding, as known in the art.

While it is relatively easy to simply switch the motor 52 and optionally motor 54 off to provide the tramlines in the forward direction v during seeding (see EP 0 868 842 A2 and WO 2012/015957 A1), this approach would hardly work in a satisfactory manner for the transverse tramlines 68 as shown in FIG. 3, since deceleration and acceleration of motor 52 requires more time than available, at least when planting at a relatively high speed in the area of 10 km/h or faster. The present disclosure thus proposes a number of possibilities to avoid this problem.

Figure 4:
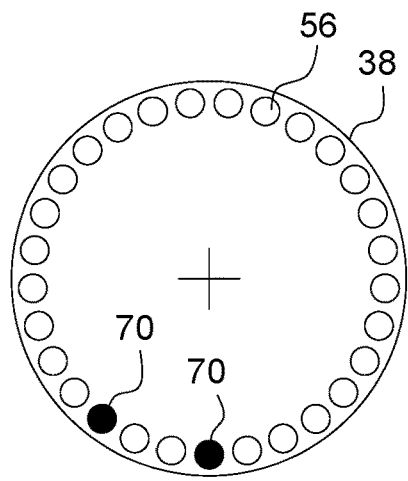
FIG. 4 is a schematic view of a first embodiment of the seed meter.
Figure 5:
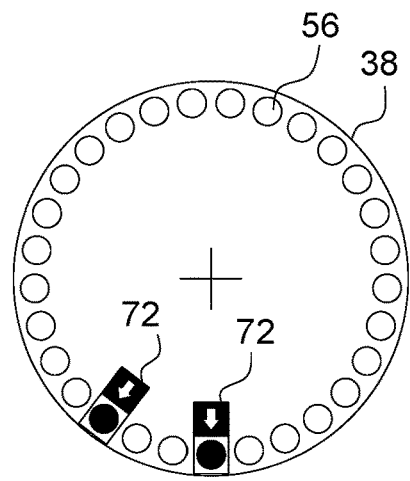
FIG. 5 is a schematic view of a second embodiment of the seed meter.

The embodiments of the seed meters 38 shown in FIGS. 4 and 5 provide a mechanical solution to for providing the desired skip during seeding for forming the tramlines 68. In the embodiment of FIG. 4, a number of apertures 56 are closed by elements 70. These elements 70 can be permanently fixed to the seed meter 38, for example by leaving away the respective apertures 56 where elements 70 are to be provided during manufacture of the seed meter 38, or by inserting and permanently fixing the element 70 in the respective aperture 56. It is also possible to have the elements 70 releasably fixed in the respective aperture 56, for example by turning them into a thread of the seed meter 38. In order to change the position of the skips defined by the elements 70, the entire seed meter 38 can be exchanged with a different one having elements 70 at other positions or no elements 70 at all or the elements 70 can be removed and inserted at other positions. It should be noted that all metering elements 38 of all planting units 20 of the seeding machine 12 need to have their elements 70 at the same position in order to achieve the pattern of FIG. 3, what can be achieved by appropriate control (synchronization) of all motors 52 of all planting units 20 by the control unit 34.

In the embodiment of FIG. 5, the elements 72 are movable (shiftable in the radial direction) between a first, inactive position as shown and a second, active position in which they close an aperture 56 to provide the desired skip for producing the tramlines 68. In this embodiment, all apertures 56 or a suitable subset of the apertures 56 can be provided with a movable element 72 as shown in FIG. 5. It should be noted that all metering elements 38 of all planting units 20 of the seeding machine 12 need to have their elements 72 at the same position in order to achieve the pattern of FIG. 3, what can be achieved by appropriate control (synchronization) of all motors 52 of all planting units 20 by the control unit 34.

Figure 6:
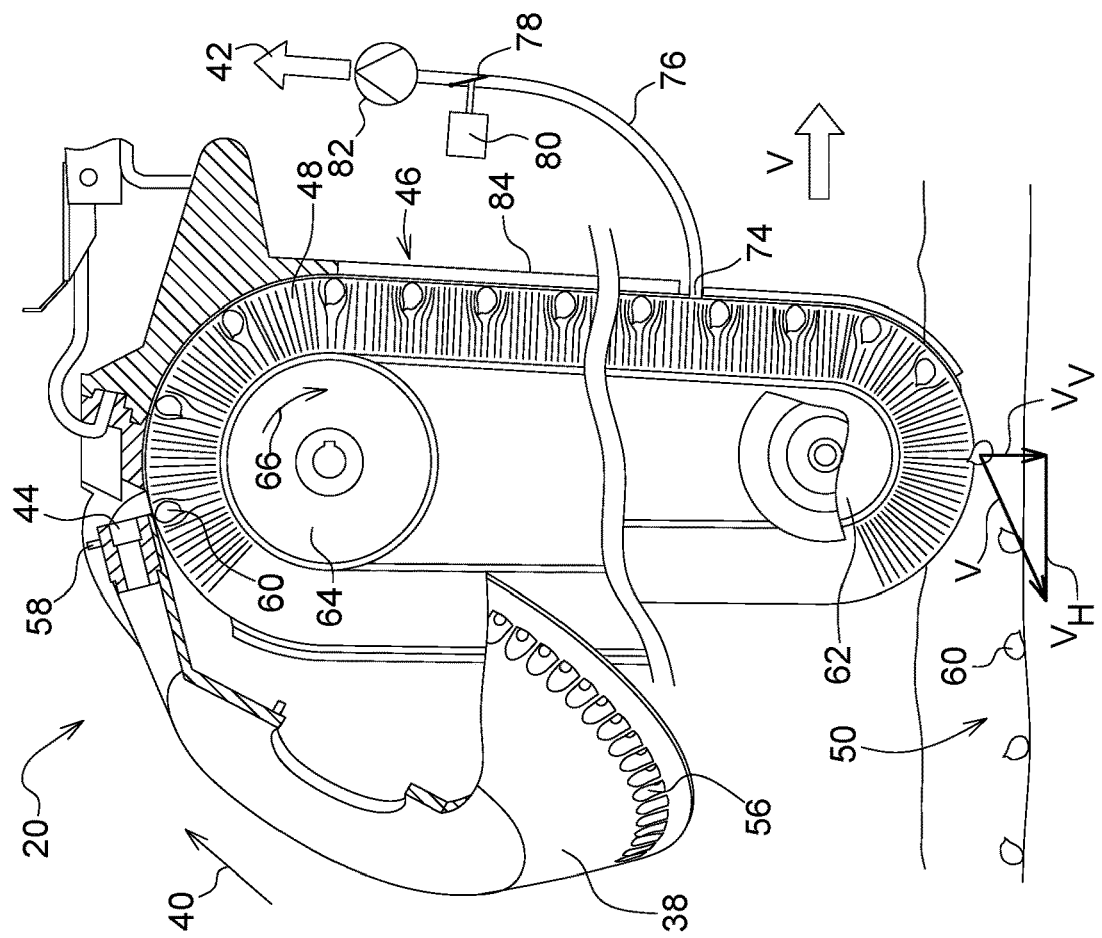
FIG. 6 is a schematic side sectional view of the seed meter and the seed delivery system shown in FIG. 2, with a seed branch-off member operable to provide the tramlines.

Another embodiment is shown in FIG. 6, wherein an opening 74 is provided in a side wall of a housing 84 of the seed delivery system 46, along which the brush belt 48 transports the seeds 60. A conduit 76 is connected to the hole with a first end and to a valve 78 with its second end. The valve 78 is adapted to be moved by an actuator 80 between an inactive position as shown in solid lines in FIG. 6 and an active position as shown in dotted line in FIG. 6. Downstream the valve 78, a vacuum air pump 82 is located, which is connected with its outlet to the seed supply 42, either directly or indirectly via a larger seed tank (not shown), from which the seeds are successively fed to the seed supply 42, as known in the art. The actuator 80 is controlled by the electronic control unit 34, which during operation sends a skip signal to actuator 80, commanding actuator 80 to move the valve 78 into the active position once a seed 60 that would otherwise be deposited at a position where the tramline 68 is to be provided is approaching, transported by brush belt 48, the opening 74. The respective seed 60 is thus sucked off the brush belt 48 and fed back to the seed supply 42, providing the desired skip in the seeds 60 producing the tramline 68. Afterwards, the control unit 34 commands actuator 80 to move the valve 78 into the inoperative position.

Reference is made again to FIGS. 1 to 3. The skip in the seeds 60 to provide the tramlines 68 can also be achieved by appropriate control of the speed of the seed delivery system 46. In this embodiment, the motor 52 of the seed delivery system 46 is driven and controlled by the control unit 34 to reduce the speed of the seed transport and stop the seed transport, to provide the skip. Thus, motor 52 is controlled by the electronic control unit 34, which during operation sends a speed reduction signal to motor 52, commanding motor 52 to reduce the speed of the brush belt 48 of the seed delivery system 46 once a seed 60 that would otherwise be deposited at a position where the tramline 68 is to be provided is approaching, transported by brush belt 48, the outlet of the seed delivery system 46. The respective seed 60 is staying on the brush belt 48 and not delivered into the furrow 50, providing the desired skip in the seeds 60 producing the tramline 68. Afterwards, the control unit 34 commands the motor 52 to move the brush belt 48 of the seed delivery system 46 with the normal speed, such that the seeds 60 are sown again at the desired positions. Since during the time when the brush belt 48 of the seed delivery system 46 was running with reduced speed or standing still to provide the skip, because motor 54 still runs at its normal speed, two seeds 60 have been delivered by the seed meter 38 to the brush belt 48 of the seed delivery system 46, the brush belt 48 of the seed delivery system 46 will have to be driven by motor 52 with twice the normal speed in order to achieve uniform spacing of the seeds 60 in the furrow once the two seeds 60 with reduced spacing on the brush belt 48 approach the outlet of the seed delivery system 46. To avoid this, it would be possible also to reduce the speed of motor 54 during the time when the brush belt 48 of the seed delivery system 46 was running with reduced speed or standing still to provide the skip.

Figure 7:
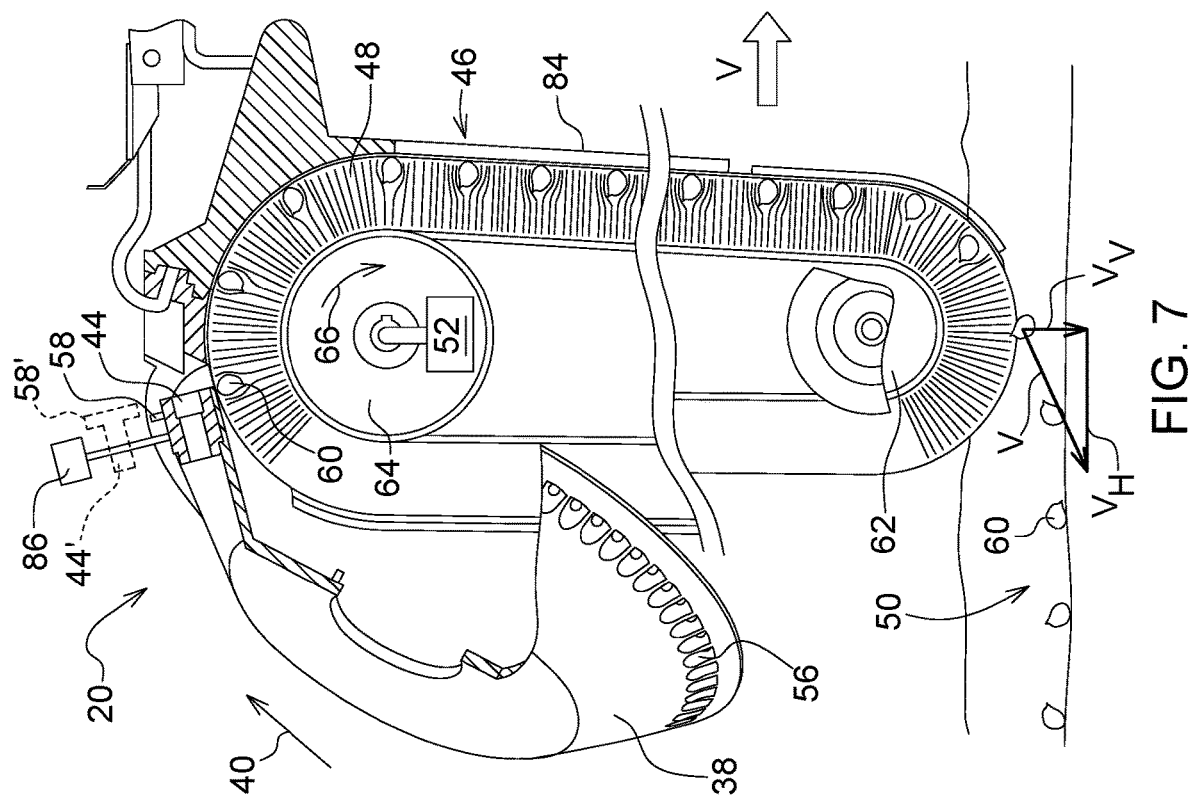
FIG. 7 is a schematic side sectional view of the seed meter and the seed delivery system shown in FIG. 2, with a seed transport device operable to provide the tramlines.

In the embodiment shown in FIG. 7, the seed transport device 44 with its fingers 58 can be moved by an actuator 86 between an active position, shown in solid lines, and an inactive position, shown in dotted lines. While the fingers 58 of seed transport device 44 is in its active position removing seeds 60 from the apertures 56 of the seed meter 38, as in the previous embodiments, the fingers 58' of the transport device 44' are spaced from the apertures 56 in the inactive position and cannot remove the seeds 60 from the apertures 56. The seeds 60 thus do not reach the seed delivery system 46 and also not the furrow 50 when the seed transport device 44 is in its inactive position. The actuator 86 is controlled by the electronic control unit 34 and commanded to move the seed transport device 44 into the inactive position once a seed 60 that would otherwise be deposited at a position where the tramline 68 is to be provided is approaching, transported by seed meter 38, the seed transport device 44. This particular seed 60 is thus not removed from the aperture 56 of the seed meter 44 but is taken down again to the seed supply 42 and reaches the seed transport device 44 at a later point in time. Afterwards, the control unit 34 commands the actuator 86 to move the seed transport device 44 into its operative position, such that the seeds 60 are sown again at the desired positions.

Figure 8:
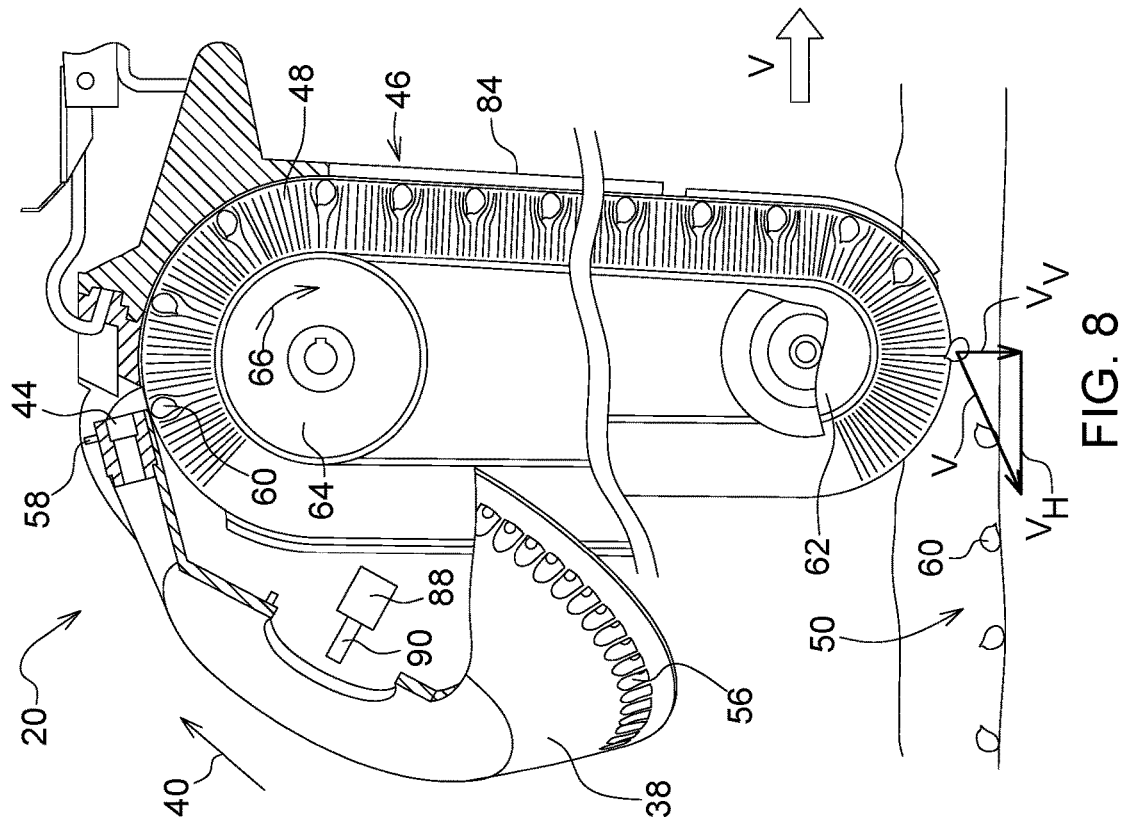
FIG. 8 is a schematic side sectional view of the seed meter and the seed delivery system shown in FIG. 2, with a mechanical seed removal device operable to provide the tramlines.

In the embodiment shown in FIG. 8, a seed removal device 90 is provided to mechanically remove a seed 60 from an aperture 56 of the seed meter 38. An actuator 88 of the seed removal device 90 is activated upon receipt of a signal from the control unit 34 to provide the skip. The seed removal device 90 is thus like a finger that can be moved by the actuator 88 between an inoperative position spaced from the apertures 56 of the seed meter 38 and an active position in which it engages into an aperture 56 and knocks a particular seed 60 out of this aperture 56. The seed 60 then falls down into the seed supply 42. The actuator 88 is controlled by the electronic control unit 34 and commanded to move the seed removal device 90 into the active position once a seed 60 that would otherwise be deposited at a position where the tramline 68 is to be provided is approaching, transported by seed meter 38, the seed removal device 90. Afterwards, control unit 34 commands actuator 88 to move the seed removal device 90 into its inoperative position, such that the seeds 60 are sown again at the desired positions. In another embodiment, the seed removal device 90 can be a transport device 44 moved by an actuator 86 like shown in FIG. 7, but mounted at the position of the seed removal device 90 of FIG. 8.

Figure 9:
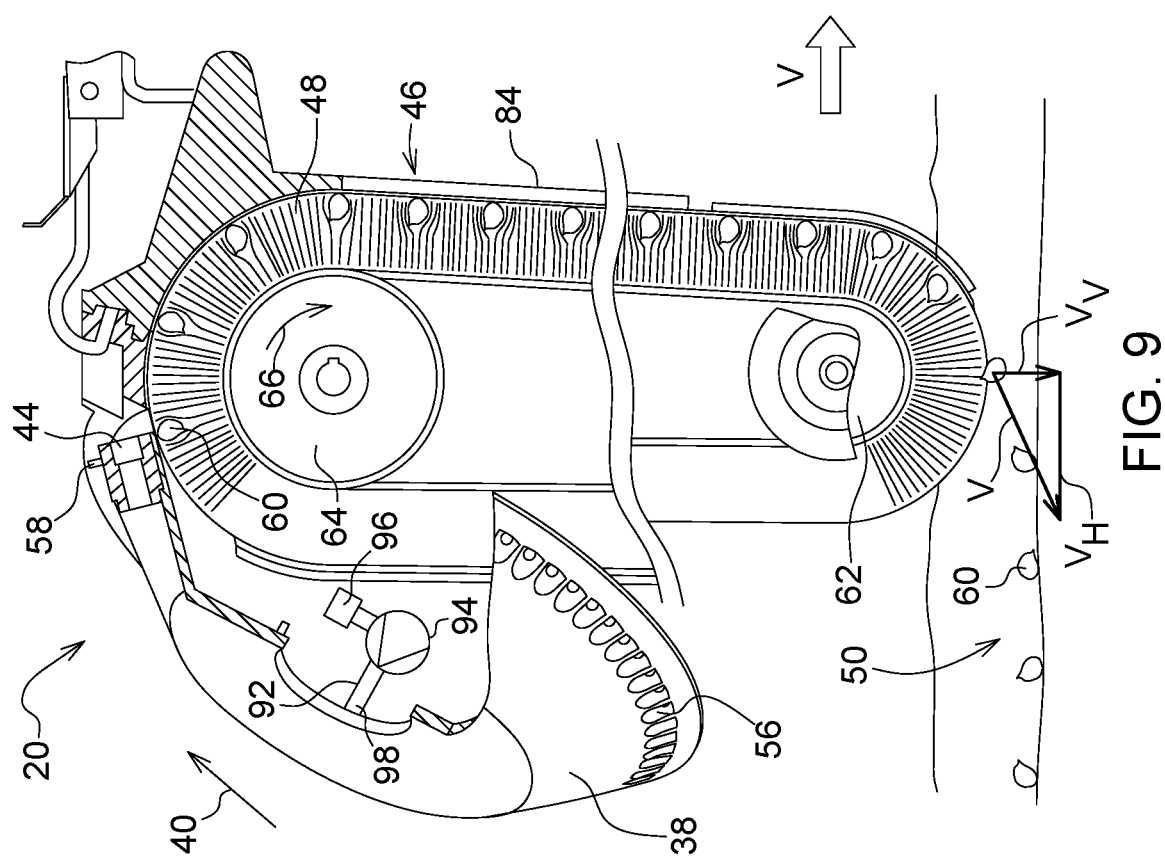
FIG. 9 is a schematic side sectional view of the seed meter and the seed delivery system shown in FIG. 2, with a pneumatic seed removal device operable to provide the tramlines.

In the embodiment shown in FIG. 9, a seed removal device 92 is provided to pneumatically remove a seed 60 from an aperture 56 of the seed meter 38. The seed removal device 92 comprises an air outlet 98 connected to an air pump 94 driven by a motor 96 controlled by the control unit 34. If the motor 96 is working, it drives the air pump 94 which provides an air stream to the seed removal device 92, which blows a seed 60 out of an aperture 56 of the seed meter 38. The seed 60 then falls down into the seed supply 42. The motor 96 is controlled by the electronic control unit 34 and activated shortly before a seed 60 that would otherwise be deposited at a position where the tramline 68 is to be provided is approaching, transported by seed meter 38, in order to blow the particular seed 60 out the aperture 56. Afterwards, control unit 34 commands motor 96 to stop, such that the seeds 60 are sown again at the desired positions.

It should be noted that the seed removal device 92 could be positioned, instead of being in the vicinity of the seed meter 38 to remove seeds 60 during their travel from seed supply 42 to the seed transport device 44 out of the aperture 56 of the seed meter 38, positioned to remove the seed from the aperture 56 immediately after it has left the seed supply 42, i.e. directly above the seed supply 42. In another embodiment, the pneumatic seed removal device can be located close to the seed transport device 44 or remove the seed 60 from the brush belt 48.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

An embodiment of this disclosure includes a planting unit for a seeding machine, comprising a seed supply, a driven seed meter adapted to receive seeds from the seed supply and to dispense a singularized seed to a seed delivery system adapted to deposit the seed within a furrow in the ground of a field, wherein the driven movement of the seed meter is adapted to be controlled by an electronic control unit such as to achieve a pre-defined pattern of the seeds on the field and the planting unit is adapted to skip dispensing of seeds at locations at which a tramline extending in an angle to the travel direction is to be provided according to the pre-defined pattern, and may include at least one of the following features:

the seed meter comprises adjacent apertures for receiving the seeds and at least one of the apertures is permanently closed or adapted to be selectively closed to provide the skip, or a seed branch-off assembly is adapted, upon receipt of a signal from the control unit, to take a seed out of the seed delivery system and to feed it back to the seed supply to provide the skip, or the seed delivery system is driven and controlled by the control unit to one of reduce the speed of the seed transport and stop the seed transport, to provide the skip, or a seed transport device is provided to move a seed from the seed meter to the seed delivery system and disabled upon receipt of a signal from the control unit to provide the skip, or a seed removal device is provided to remove a seed from the seed meter and activated upon receipt of a signal from the control unit to provide the skip.

In another embodiment, the seed meter comprises adjacent apertures for receiving the singularized seeds and at least one of the apertures is permanently closed to provide the skip and the seed meter is exchangeable dependent on the desired pattern.

In another embodiment, the seed meter comprises adjacent apertures for receiving the singularized seeds and at least one of the apertures is closed by a removable element to provide the skip.

In another embodiment, the seed meter comprises adjacent apertures for receiving the singularized seeds and at least one of the apertures is closed by an element which is movable between an inactive and an active position to provide the skip.

In another embodiment, the element is movable in a radial direction of the seed meter.

In another embodiment, the seed branch-off assembly is adapted, upon receipt of a signal from the control unit, to withdraw a seed out of the seed delivery system by suction and to feed it back to the seed supply using an air stream.

In another embodiment, the driven seed delivery system comprises a belt with pockets or a brush belt.

In another embodiment, the seed transport device is movable by an actuator between an operative and an inoperative position and the actuator controlled by the electronic control unit to move the seed transport device into the inoperative position upon receipt of a signal from the control unit.

In another embodiment, the seed removal device is movable by an actuator between an operative position for mechanically removing a seed from the seed meter and an inoperative position and the actuator is controlled by the electronic control unit to move the seed transport device into the operative position upon receipt of a signal from the control unit.

In another embodiment, the seed removal device comprises an air outlet for blowing the seed from the seed meter to the seed supply and the air outlet is controlled by an actuator controlled by the electronic control unit.

In another embodiment, the seeding machine comprises a toolbar supporting a number of planting units spaced in a direction transversely to a travel direction of the seeding machine, all planting units controlled by the electronic control unit.

While particular embodiments have been shown and described, it is clear to the skilled man that the scope of the claims is not restricted to these embodiments and that modifications are possible. For example, the brush belt 48 could be replaced with a belt having recesses for accommodating the seeds 60. Also, different shapes of the seed meter 38, like a flat disk, are possible.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A planting unit for a seeding machine, comprising:
a seed supply;
a driven seed meter adapted to receive a singularized seed from the seed supply and to dispense the singularized seed to a seed delivery system adapted to deposit the singularized seed within a furrow of a field at a speed, wherein the driven seed meter is adapted to be controlled by an electronic control unit to achieve a pre-defined pattern of the singularized seed in the field and the planting unit is adapted to skip dispensing of the singularized seed at locations at which a tramline extending in an angle to a travel direction is provided according to the pre-defined pattern; and
a seed branch-off assembly, the seed branch-off assembly adapted, upon receipt of a signal from the electronic control unit, to take a singularized seed out of the seed delivery system and to feed the singularized seed back to the seed supply to provide the skip.

2. The planting unit of claim 1, wherein the seed branch-off assembly is adapted, upon receipt of a signal from the electronic control unit, to withdraw a singularized seed out of the seed delivery system by suction and to feed it back to the seed supply using an air stream.

3. A planting unit for a seeding machine, comprising:
a seed supply; and
a driven seed meter adapted to receive a singularized seed from the seed supply and to dispense the singularized seed to a seed delivery system adapted to deposit the singularized seed within a furrow of a field at a speed, wherein the driven seed meter is adapted to be controlled by an electronic control unit to achieve a pre-defined pattern of the singularized seed in the field and the planting unit is adapted to skip dispensing of singularized seed at locations at which a tramline extending in an angle to a travel direction is provided according to the pre-defined pattern;
wherein the driven seed meter comprises adjacent apertures for receiving the singularized seed and at least one of the adjacent apertures is closed by an element which is movable between an inactive and an active position to provide the skip.

4. The planting unit of claim 3, wherein the element is movable in a radial direction of the driven seed meter.

* * * * *